Nov. 11, 1969     G. KINDER     3,477,355
AUTOMATIC FILM SPEED SETTING FOR CAMERAS
Filed March 28, 1967

United States Patent Office 3,477,355
Patented Nov. 11, 1969

3,477,355
AUTOMATIC FILM SPEED SETTING FOR CAMERAS
Gotthard Kinder, Braunschweig, Germany, assignor to Voigtlander, A.G., Braunschweig, Germany
Filed Mar. 28, 1967, Ser. No. 626,524
Claims priority, application Germany, Apr. 14, 1966, V 18,871
Int. Cl. G03b 19/04, 9/02; G01j 1/00
U.S. Cl. 95—31    5 Claims

ABSTRACT OF THE DISCLOSURE

A camera capable of having its light meter automatically set in accordance with the speed of the film which is exposed. The electrical circuit of the light meter is adjusted by coaction of a set of stationary and a set of movable contacts, and a cassette which carries the film is sensed by a sensing structure which controls the movable contacts with respect to the stationary contacts. The cassette has a structure indicative of the speed of the film therein, and the sensing structure engages the cassette in accordance with the structure thereof which is indicative of the film speed for locating the movable contacts in this way at a predetermined location with respect to the stationary contacts for influencing the light meter in accordance with the film speed. The cassette sensing structure is displaced from a starting position to its position coacting with the cassette by the film advancing structure of the camera.

Background of the invention

The invention relates to cameras.

In particular, the invention relates to cameras provided with electric light meters the operation of which is influenced by a photosensitive element which is exposed to light. In addition, the invention relates to that type of camera which is adapted to receive a film cassette having thereon a structure which indicates the speed of the film therein.

With conventional cameras of this type a sensing device is capable of sensing the film speed indicating structure of the cassette, and the film transporting structure of the camera moves the scanning device during transportation of the first film frame along that region of the cassette where the film speed indicating structure is located. This sensing device includes a shiftable member which is shifted by the film transporting means and a movable sensing member which is movably carried by the shiftable member and which engages the film speed indicating structure of the cassette to interrupt the connection between the sensing device and the film transporting structure when the sensing member engages the film speed indicating structure of the cassette, so that in this way the position to which the sensing means is moved will be determined by the speed of the film in the cassette. This sensing device includes a rack which meshes with a pinion operatively connected to the rotary housing of the electrical light meter so as to mechanically set the latter at an initial position according to the film speed. In this way it is possible to automatically adjust the light meter in accordance with the speed of the film. This adjustment takes place in a purely mechanical manner by way of a direct mechanical connection between the scanning device and the moving coil instrument which forms the light meter.

However, there are situations where the structure of the camera is such that a direct mechanical connection between the sensing device and the light meter cannot be made. In addition, such mechanical connections quite often do not provide an adjustment of sufficient accuracy.

Summary of the invention

It is accordingly a primary object of the present invention to provide a camera of the above general type which will avoid the above drawbacks.

In particular, it is an object of the invention to provide a camera of this type which does not require the structure which senses the cassette to have a predetermined position with respect to the light meter.

Thus, it is an object of the present invention to provide a camera in which it is possible to locate the light meter and the cassette sensing structure at any desired locations according to the space which is available in the camera.

Furthermore, it is an object of the present invention to provide a construction of this type which is exceedingly simple and at the same time even more accurate than a purely mechanical connection of the type referred to above.

In accordance with the invention these objects are achieved by connecting into the electrical circuit in which the light meter is located an electrical means which has a plurality of portions to be connected into the circuit in different ways for controlling the operation of the light meter according to the film speed. A sensing means is provided for sensing the structure of the cassette which indicates the speed of the film therein, and this sensing means will automatically assume a position determined by the film speed. A movable contact means is connected into the electrical circuit and is operatively connected with the sensing means to be moved thereby also to a position determined by the film speed, while a stationary contact means is electrically connected with the electrical means, the movable contact means coacting with the stationary contact means for connecting the portions of the electrical means into the circuit in accordance with the film speed.

This electrical means is photosensitive and has the plurality of portions which are to be connected in different ways into the circuit so as to control the operation of the light meter, and thus in accordance with the position of the movable contact means, as determined by the film speed, different portions of the photosensitive electrical means will be connected into the circuit of the light meter. The movable contact means is preferably carried directly by the sensing means for movement therewith, and it is preferred to provide a straight-line movement for the sensing means.

Thus, with the camera of the invention the light meter is controlled to operate in accordance with different film speeds in accordance with the number of the portions of the electrical means which are connected into the electrical circuit. This latter number of portions is controlled by way of the sensing means as a result of the direct movement of the movable contact means with respect to the stationary contact means which is derived by way of the sensing means which carries the movable contact means. Thus, no mechanical connection between the scanning means and the light meter means is required. An electrical connection is sufficient, and this electrical connection which is provided with the structure of the invention is simpler and less expensive than a mechanical connection, requires less space, and does not necessitate a predetermined location of mechanical components with respect to each other. As a result of the electrical adjusting structure of the invention, all inaccuracies which are inherent in and unavoidable with mechanical connections are avoided.

There are known cameras having built-in light meters, provided with light-sensitive elements divided into portions which can be selectively rendered operative or inoperative. However, with these known structures, the connections of these portions of the light-sensitive structure into the circuit with the known constructions is carried out by way of contacts which are manually operable when the exposure time setting structure of the camera is adjusted. Thus, these known constructions do not provide an automatic sensing of the film speed which is transmitted to the contacts, but instead there is only a manual adjustment of the exposure time.

With an arrangement where the scanning means is moved along a straight path upon actuation of the film transporting structure, the movable contact means of the invention is preferably mounted directly on a shiftable member of the sensing means which moves along a straight line. In this way no additional components are required to form a support for or to move the movable contact means.

It is preferred with the structure of the invention to provide a photosensitive element in the form of a cell which includes a photosensitive resistor having end connections and a central tap. One of these end connections of the photosensitive resistor is electrically connected with the light meter. A stationary contact means of the invention has a pair of contacts one of which is connected to the other of the end connections of the photosensitive resistor and the other contact of the stationary contact means is electrically connected to the central tap of the photosensitive resistor. This contact of the stationary contact means which is connected to the central tap of the photosensitive resistor has a width which corresponds to the maximum shifting movement of the shiftable member of the scanning means. The movable contact means of the structure of the invention has a pair of contacts which are adapted to coact with the contacts of the stationary contact means. In accordance with the position of the shiftable member of the sensing means, as determined by the speed of the film in the cassette, the contacts of the movable contact means will engage both of the contacts of the stationary contact means, or one of the contacts of the movable contact means will engage one of the contacts of the stationary contact means, this movable contact means being electrically connected into the circuit of the light meter so as to provide in this way different connections of the portions of the photo-sensitive resistor into the circuit of the light meter to control the operation of the latter in accordance with the film speed. Thus, by utilizing with the structure of the invention a photosensitive resistor having a central tap, it is possible to provide an exceedingly simple construction which permits three different film speed ranges to be achieved.

Brief description of the drawings

For a fuller understanding of the invention, reference is had to the following description taken in connection with the accompanying drawings, in which.

Description of a preferred embodiment

Figure 1:
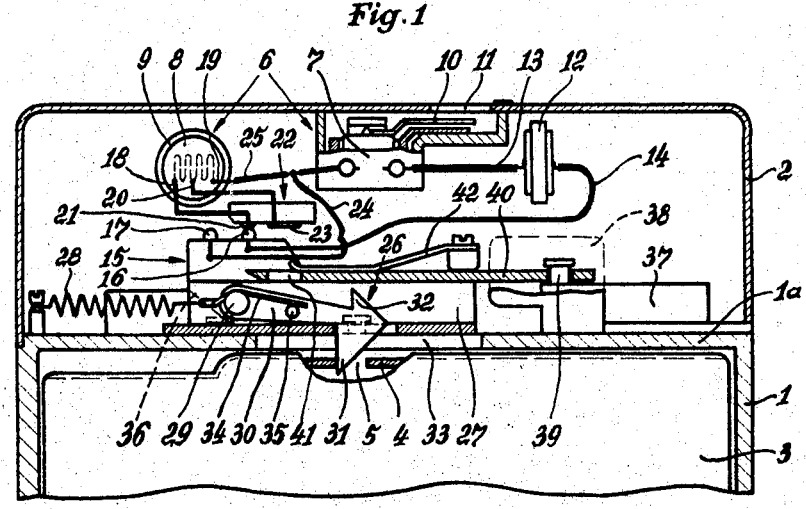
FIG. 1 shows a section taken in a vertical plane the upper part of a camera provided with the structure of the invention.

Referring now to the drawings, there is shown therein a camera housing 1 which carries at its top wall a cap 2 which defines with the top wall 1a of the housing 1 a chamber for accommodating the structure of the invention. The housing 1 has a film chamber capable of receiving a film cassette 3 in the case of FIG. 1 and a film cassette 3′ in the case of FIG. 2. The film cassette 3 has an elongated portion 4 extending along a side of the camera which is adjacent to the top wall 1a of the housing 1 thereof, and the film cassette 3′ has an elongated portion 4′ situated at the same location. The portion 4 of the cassette 3 is provided with a cutout 5 while the portion 4′ of the cassette 3′ is provided with a cutout 5′. The positions of these cutouts along the portions 4 indicate the speed of the film which is in the cassette. Thus, in the case of FIG. 1 it will be noted that the cutout 5 is situated further to the left than the cutout 5′ of the cassette 3′, so that this structure indicates that these cassettes respectively house films of different speeds. In the illustrated example the speed of the film in the cassette 3 is less than the speed of the film in the cassette 3′.

Within the cap 2 is situated an electrical light meter means 6 which includes a moving coil instrument 7 and a photosensitive resistor cell 8. The photosensitive resistor cell derives its light from a window 9 which is situated at an end wall of the camera cap 2. The moving coil instrument 7 includes a pointer 10 which turns with the rotary coil of the instrument and which can be seen through a window 11 situated at the upper wall of the cap 2. A second pointer may be manually adjusted so as to be brought into alignment with the pointer 10 of the light meter, so as to produce the required adjustment of the diaphragm or the exposure time, or these adjustments can be carried out automatically in which case the pointer 10 indicates only the light intensity. The light meter means 6 is located in an electrical circuit which includes the battery 12. This battery 12 is electrically connected with the light meter through a conductor 13. By way of a conductor 14 the battery 12 is connected to a contact 16 of a movable contact means 15 which is provided with a second contact 17. The photosensitive resistor 8 has a pair of end connections 18 and 19, located at the rim of the cell, and the photosensitive resistor also has a central tap 20 which divides the resistor into a pair of equal resistor portions. The end connection 18 is electrically connected with one contact 21 of a stationary contact means 22 which coacts with the movable contact means 15 in the manner described below. This stationary contact means 22 has a second, wider contact 23 which is electrically connected with the central tap 20. The contact 17 of the movable contact means 15 is connected by way of a conductor 24 with a conductor 25 which provides an electrical connection between the moving coil instrument 7 of the light meter means and the other end connection 19 of the photosensitive resistor.

In order to sense the film speed of the cassette, a sensing means 26 is provided in the camera cap 2. This sensing means 26 includes a shiftable member 27 which is guided for movement in a direction parallel to the elongated portions 4 or 4′ of the cassettes 3 or 3′, respectively. For example, any suitable pin-and-slot structure may connect the shiftable member 27 to the wall 1a, for example, so as to guide the shiftable member 27 for movement along a straight line parallel to the elongated portions 4 or 4′. A spring 28 is connected at one end to a stationary component of the camera and at its other end to the shiftable member 27 so as to form a spring means which urges the shiftable member 27 to the left, as viewed in the drawings, to a starting position which is determined by the structure which guides the member 27 for movement. For example, an end of a guide slot may engage a pin which extends into this slot for determining the starting position of the shiftable member 27 of the sensing means 26. A sensing member 30 is movably carried by the shiftable member 27 and also forms part of the sensing means. This sensing member 30 takes the form of a lever which is supported for swinging movement by a pivot pin 29 which is carried by the shiftable member 27, and the lever 30 has a downwardly directed sensing tip 31 and an upwardly directed motion-transmitting projection 32. The top wall 1a of the camera housing is formed with an elongated slot 33 which extends along the path of movement of the shiftable member 27 and through which the sensing tip 31 of the sensing member 30 extends. A spring 34 extends around the pin 29 and engages a pin 35 which is fixed to the lever 30 so as to urge the latter in a clockwise direction, as viewed in the drawings. Within the camera cap there is located a stationary inclined surface 36 up which the pin 35 is adapted to ride during the return of the sensing means 26 to its starting position, so that in this way the lever 30 will be raised.

A film transporting lever 37, having a handle 38 accessible to the operator, carries a pivot pin 39 by means of which a coupling arm 40 is pivotally connected to the film transporting means, and this arm 40 is formed with an opening 41 for receiving the motion-transmitting projection 32. The arm 40 is also guided for movement at its opening 41 along a straight path so that it will coact properly with the motion transmitting projection 32. Thus, for this purpose a leaf spring 42 is fixed at one end to a stationary camera part and presses against the coupling arm 40 so as to maintain the latter in a position for proper coaction with the shiftable member 27. The arm 40 is pressed directly against the member 27 by the leaf spring 42.

The movable contact means 15 is fixedly carried directly by the shiftable member 27 and for this purpose is directly mounted thereon, while the stationary contact means 22 is mounted on any suitable stationary support within the cap 2.

The above-described structure operates in the following manner:

When the shiftable member 27 is situated at its left starting position which is not illustrated in the drawings, before a cassette 3 or 3' is introduced into the camera, this shiftable member 27 is maintained yieldably in its starting position by the force of the spring 28. At this time the pin 35 has moved up the inclined surface 36 so that the scanning member 30 has been raised upwardly from the position thereof shown in the drawing, in a counter-clockwise direction. The motion transmitting projection 32 at this time extends into the opening 41 of the coupling arm 40. The scanning tip 31 has been retracted out of the cassette chamber of the camera.

Figure 2:
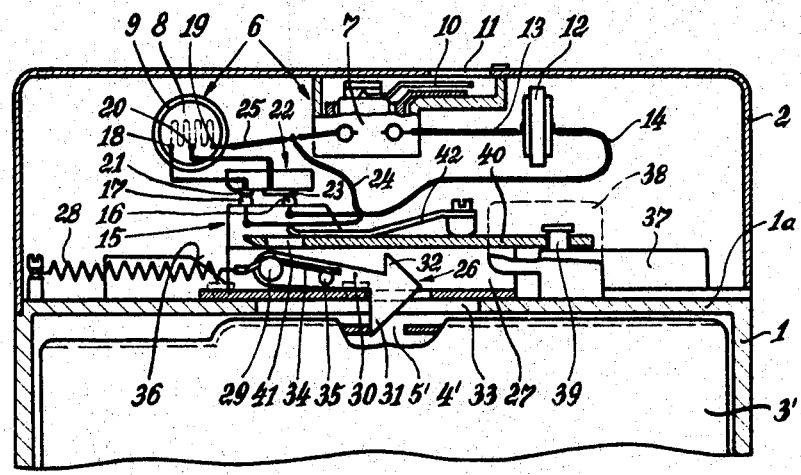
FIG. 2 shows, also in a vertical sectional view, the structure of FIG. 1 in a position different from that of FIG. 1.

At this time it is possible to introduce a cassette into the camera without any hindrance from any of the structure of the invention. During the initial actuation of the film transporting means, the coupling arm 40, because the projection 32 is in the opening 41 thereof, advances the lever 30 and the pin 29 as well as the shiftable member 27 to which the pin 29 is fixed to the right, as viewed in the drawings. The pin 35 now rides down the inclined surface 36 so that the spring 34 turns the scanning lever 30 in a clockwise direction, thus displacing the right end of the lever downwardly. The sensing tip 31 therefore engages the elongated portion 4 or 4' of the cassette which was placed in the camera. Thus, the sensing tip 31 will ride along the portion 4 or 4' of the cassette 3 or 3', respectively. As soon as the sensing tip 31 reaches the cutout 5 or the cutout 5', it falls into this cutout, thus displacing the motion-transmitting projection 32 out of the opening 41 and interrupting the motion-transmitting connection between the sensing means and the coupling arm 40 of the film transporting means. Thus, the shiftable member 27 of the sensing means will remain in a position which is determined by the film speed. FIGS. 1 and 2 respectively show the sensing means 26 in different positions inasmuch as the different locations of the openings 5 and 5' along the portions 4 and 4' of the cassettes 3 and 3', respectively, are indicative of films of different speeds situated in these cassettes.

As may be seen from the drawing, in the starting position of the sensing means, the movable contact means 15 is situated so far to the left that its contacts 16 and 17 are completely out of engagement with the contacts 21 and 23 of the stationary contact means 22.

Where the cutout 5 has the position shown in FIG. 1, the shiftable member 27 of the sensing means will be advanced to the right from its starting position to a location where the leading contact 16 of the movable contact means engages the left contact 21 of the stationary contact means. As a result, the entire resistance R of the photosensitive resistor 8 is located in the electrical circuit of the light meter. This provides a control of the operation of the light meter suitable for a film which has a low degree of sensitivity so that it does not have a great film speed. This low film speed is indicated by the position of the cutout 5 of FIG. 1.

On the other hand, where the film has a greater film speed, then the cutout is situated further to the right as shown for the cutout 5' of FIG. 2, and thus the shiftable member 27 will only stop moving after it has moved beyond the position of FIG. 1 into the position of FIG. 2, for example, where the sensing tip 31 is located in the opening 5'. In this case both of the contacts 16 and 17 respectively engage the contacts 23 and 21, so that there is connected into the circuit of the light meter a resistance of $R/4$.

Between these two positions there is an intermediate position where only the contact 16 engages the contact 23, and in this position of the parts the resistance value is $R/2$.

It will be noted that the width of the contact 23 is such that its left portion is capable of being engaged by the contact 16 before the contact 17 engages the contact 21, while at the same time during continued movement of the movable contact means 15 the contact 16 will remain in engagement with the contact 23 until the contact 17 engages the contact 21, so that the parts have the position shown in FIG. 2. Thus, the width of the contact 23 corresponds to the maximum possible movement for the shiftable member 27.

Thus, in the above-described manner, the particular resistance which is set into the electrical circuit of the light meter is automatically regulated by the sensing means 26 in accordance with the film speed.

When the cassettes 3 or 3' are removed from the camera, the spring 28 returns the shiftable member 27 to the left to its starting position, and during this movement the pin 35 engages and rides up the inclined surface 36 so as to raise the scanning tip 31 upwardly into its starting elevation where it is situated upwardly beyond the film chamber. The movable contact means 15 is completely separated from the stationary contact means 22 at this time, so that the light meter is automatically rendered inoperative by opening of its circuit.

Of course, the invention is not limited to the particular details described above and shown in the drawings. It is to be understood that instead of a film speed indicating structure in the form of cutouts it is possible to use other film speed indicating structure at the cassettes. For example, it is possible to provide the cassette with a projection whose size is indicative of the film speed with such a projection located at such a location that when the cassette is introduced into the camera, the length of this projection of the cassette is such that it will displace a plunger through a given distance, and this plunger can be used for adjusting the movable contact means.

All of the above features of the description and drawings, including the structural details thereof, can, in accordance with the invention, be combined together in any desired combinations.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a camera capable of receiving a film cassette which carries a structure which indicates the speed of the film which is in the cassette, an electrical circuit, electric light meter means connected into said circuit, electrical means having a plurality of portions to be connected into said circuit in different ways for controlling the operation of said light meter means according to the speed of the film in the cassette, stationary contact means electrically connected with said electrical means, sensing means for sensing a cassette in the camera at the structure thereof which indicates the speed of the film therein for automatically assuming a position determined by the speed of the film in the cassette, and movable contact means operatively connected to said sensing means to be moved thereby and coacting with said stationary contact means for automatically connecting said electrical means into the circuit in a manner which adjusts the operation of said light meter means according to the speed of the film, the position of said movable contact means with respect to said stationary contact means being determined by the position of said sensing means, said movable contact means being carried by said sensing means for movement therewith, said movable contact means moving along a predetermined path, and said stationary contact means being located at said path to be engaged by said movable contact means, said sensing means and said movable contact means therewith moving along a straight path, and said sensing means including a shiftable member and a sensing member movably carried by said shiftable member, and film transporting means operatively connected to said shiftable member for advancing the latter along said straight path when said film-transporting means is actuated, said movable contact means being carried by said shiftable member.

2. The combination of claim 1 and wherein said electrical means is photosensitive.

3. The combination of claim 2 and wherein said electrical means is a photosensitive resistor having a pair of end connections and a central tap dividing said resistor into a pair of resistor portions, one of said end connection being electrically connected with said light meter means, and said stationary contact means having a pair of contacts one of which is electrically connected with the other of said end connections and the other of which is electrically connected with said central tap, said movable contact means having a pair of contacts electrically connected into said circuit and engaging one of both of said contacts of said stationary contact means according to the position of said movable contact means determined by said scanning means.

4. The combination of claim 3 and wherein said other contact of said stationary contact means which is connected to said central tap has a width corresponding to the maximum movement of said scanning means.

5. The combination of claim 1 and wherein a spring means coacts with said sensing means for locating the latter, when there is no cassette in the camera, at a position situating said movable contact means beyond and out of electrical contact with said stationary contact means.

References Cited

UNITED STATES PATENTS

| 2,186,613 | 1/1940 | Mihalyi | 95—64 |
| 3,176,599 | 4/1965 | Anwyl. | |
| 3,266,395 | 8/1966 | Kremp. | |
| 3,410,187 | 11/1968 | Kaneko. | |

JOHN M. HORAN, Primary Examiner

U.S. Cl. X.R.

95—10, 64